United States Patent
Lee

(10) Patent No.: US 6,470,590 B1
(45) Date of Patent: Oct. 29, 2002

(54) BRAKE DEVICE FOR A TAPE RULE

(76) Inventor: Shih-Lin Lee, 1F,No.22,Lane 81, Sec.2, Tunha S.Rd., Taipei City (TW)

( * ) Notice: Subject to any disclaimer, the term of this patent is extended or adjusted under 35 U.S.C. 154(b) by 33 days.

(21) Appl. No.: 09/660,935

(22) Filed: Sep. 13, 2000

(51) Int. Cl.[7] .............................................. G01B 3/10
(52) U.S. Cl. ...................................................... 33/767
(58) Field of Search ........................... 33/755, 761, 767; 242/381.2, 381.3, 381.6

(56) References Cited

U.S. PATENT DOCUMENTS

| | | | | |
|---|---|---|---|---|
| 4,474,340 A | * | 10/1984 | Duda | 33/767 |
| 4,938,430 A | * | 7/1990 | Chapin | 33/767 |
| 4,998,356 A | * | 3/1991 | Chapin | 33/761 |
| 5,001,843 A | * | 3/1991 | Chapin | 33/767 |
| 5,007,178 A | * | 4/1991 | Dewire et al. | 33/767 |
| 5,210,956 A | * | 5/1993 | Knispel et al. | 33/761 |
| 5,379,523 A | * | 1/1995 | Wingert | 33/767 |
| 5,395,069 A | * | 3/1995 | Chen | 33/767 |
| 6,085,433 A | * | 7/2000 | Li | 33/755 |
| 6,256,901 B1 | * | 7/2001 | Lin | 33/755 |
| 6,276,071 B1 | * | 8/2001 | Khachatoorian | 242/381.3 |

* cited by examiner

*Primary Examiner*—G. Bradley Bennett
(74) *Attorney, Agent, or Firm*—Rosenberg, Klein & Lee

(57) ABSTRACT

A brake device for a tape rule is provided that comprises a housing composed of an upper housing and a lower housing, a control device having a brake button portion and a release button portion. The brake button has an extended supporting arm formed thereon that includes a confining slit. A brake strap having a spring tongue with a protuberance formed at its end is displaced by the control device. With this structure, the control device is assembled in the housing with both the brake button and the release button extending out of the housing. The brake strap is guided in slide slots formed on the housing such that the protuberance of the spring tongue is mated with the top edge of the slide slot formed on the lower housing. The top end of the brake strap is received in the confining slit, the bottom end thereof is disposed near the surface of the tape. The detaining or releasing function of the brake can be performed with the aid of resiliency of the flexed spring tongue.

1 Claim, 5 Drawing Sheets

BRAKE DEVICE FOR A TAPE RULE

BACKGROUND OF THE INVENTION

1. Field of the Invention

The present invention relates to a brake device for a tape rule, and more particularly to an elaborately designed brake device for a type rule which can definitely control halting the tape in a desired position when it is pulled out for measurement.

2. Description of the Prior Art

A tape rule is widely applicable for surveying work both in domestic and engineering fields such as, interior design, furniture arrangement, civil engineering and building construction, etc. Incidentally it is found that a conventional tape rule has inherent shortcomings as follows:

1. Its brake device (a key button) is not easily controllable for an extended tape, and in the worst case, permits the tape to cause an injury to the user or a third person standing near the user.
2. Frequent operation of a brake device reduces the durability of a tape rule, especially in the case where the brake device includes metallic springs or screws. A high-fault rate of the brake device increases production cost of a tape rule.
3. When it is necessary to measure several objects successively, it is inconvenient because a conventional brake device is not suitable for frequent operation as described above.
4. A conventional tape rule must be securely kept out of the reach of children, as the extended tape will normally retract automatically at a very high speed, which is dangerous to a child that tampers with it.

There was an improved design for a brake device for a tape rule patented in U.S. Pat. No. 4,976,048. In this cited case, braking a tape is carried out by a toggle and its shoe. There is a pivot arm provided on the toggle, and the end of the pivot arm is formed into a U-shaped pivot recess that hooks on a bearing shaft of the shoe. An aperture is further formed on the lower end of the bearing shaft which makes the pivot arm of the toggle able to revolve around the bearing shaft of the shoe. As soon as the tape has been pulled out and positioned in a desired position thereof, the user may press an off side of the toggle to urge a brake strap against the tape by turning the pivot arm, thereby achieving the aim of halting the movement of the tape. On the other hand, when retracting the tape, by pressing an on side of the toggle, the pivot arm turns to bring the shoe off the tape so that the tape is released to wind back on the reel and it returns into the housing. With this structure, the brake device of the cited case performs the braking function of the tape. However, it should be noticed that in this structure the forces for braking and releasing the tape are concentrated in the hooked portion of the pivot arm and the bearing shaft because the shoe is driven by the pivot arm. After the tape rule has been in use for a certain time, the pivot recess formed at the end of the pivot arm is likely to crack, thereby causing the brake device to lose its function. Besides, in the event that the bearing shaft disengages from the pivot recess during braking of the tape, the tape will get stuck and fail to be wound back into the housing. In addition, a tape rule with such a brake device is too sophisticated to assemble owing to its complicated structure. That leads to an increase in the production cost and discourages users from purchasing the product.

SUMMARY OF THE INVENTION

It is an object of the present invention to provide a simply constructed, easily operable brake device for a tape rule, thereby upgrading the quality of a tape rule and minimizing its production cost.

To achieve this object, the brake device for a tape rule according to the present invention comprises a housing composed of an upper housing and a lower housing, a control device, and a brake strap. There are a pair of breaches, guide slots, positioning pins and slide slots respectively formed in the upper and the lower housings, facing each other. Main components of the brake device are the control device and the brake strap. The control device emerges out of the housing with its brake button and release button extending out of the breaches of the upper and the lower housings. The brake strap is set in the slide slots of the upper and lower housings with its one end received in a confining slit, while its other end is disposed in a position near the tape. The brake strap is further equipped with a spring tongue having a protuberance formed at its end for positioning the brake strap in the slide slots thereof. When the brake button is pressed, a supporting arm of the brake button pushes the brake strap to press against the tape and halt it thereat, while the spring tongue is blocked by the slide slot on the lower housing, and causing the spring tongue to be flexed to produce a resilient force. As soon as the releasing button is pressed, the brake strap restores its initial state with the aid of the resiliency of the spring so that the tape is released from detention and is free to retract.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENT

Figure 1:
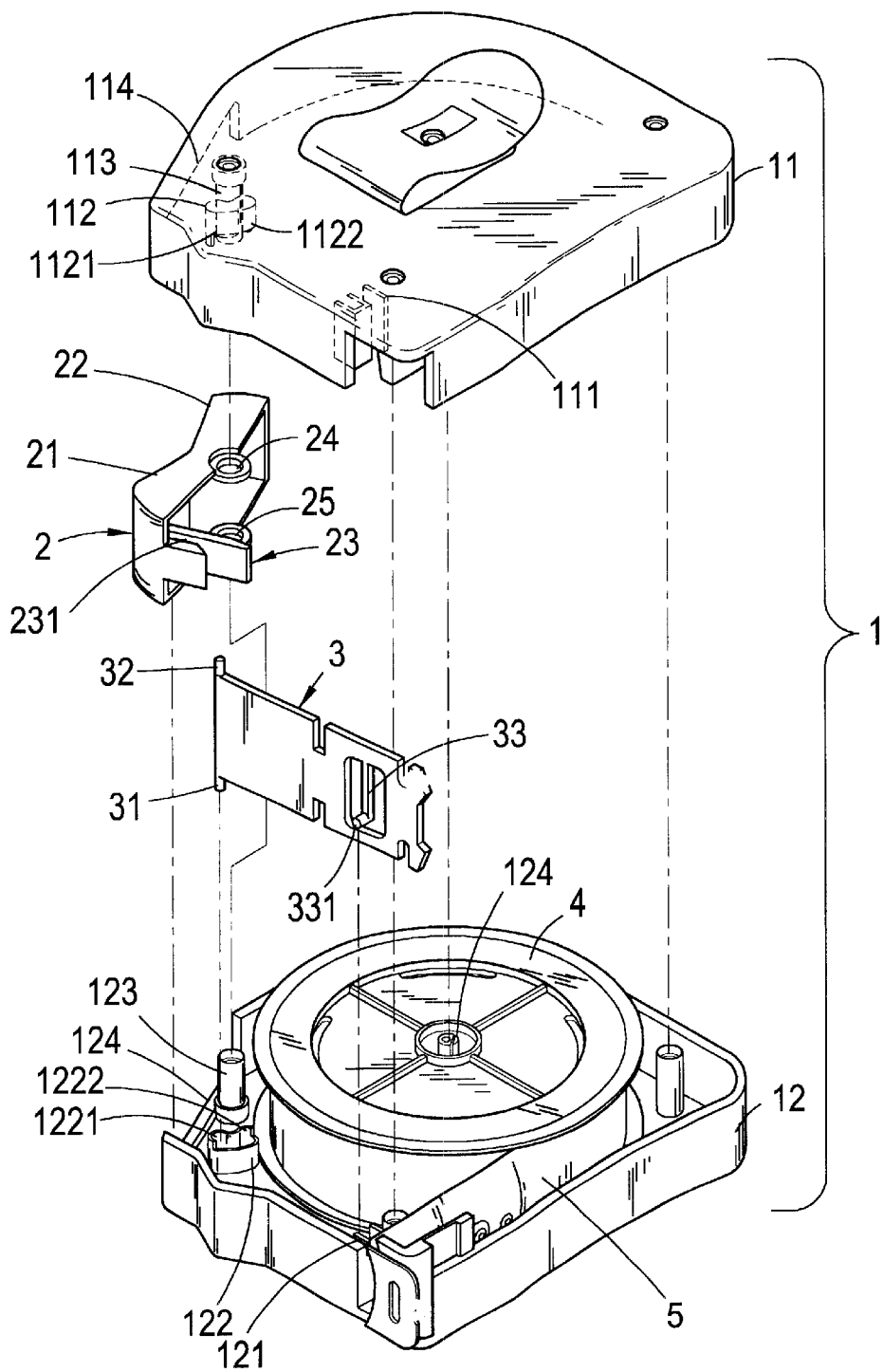
FIG. 1 is an exploded illustrative view of the present invention.
Figure 2A:
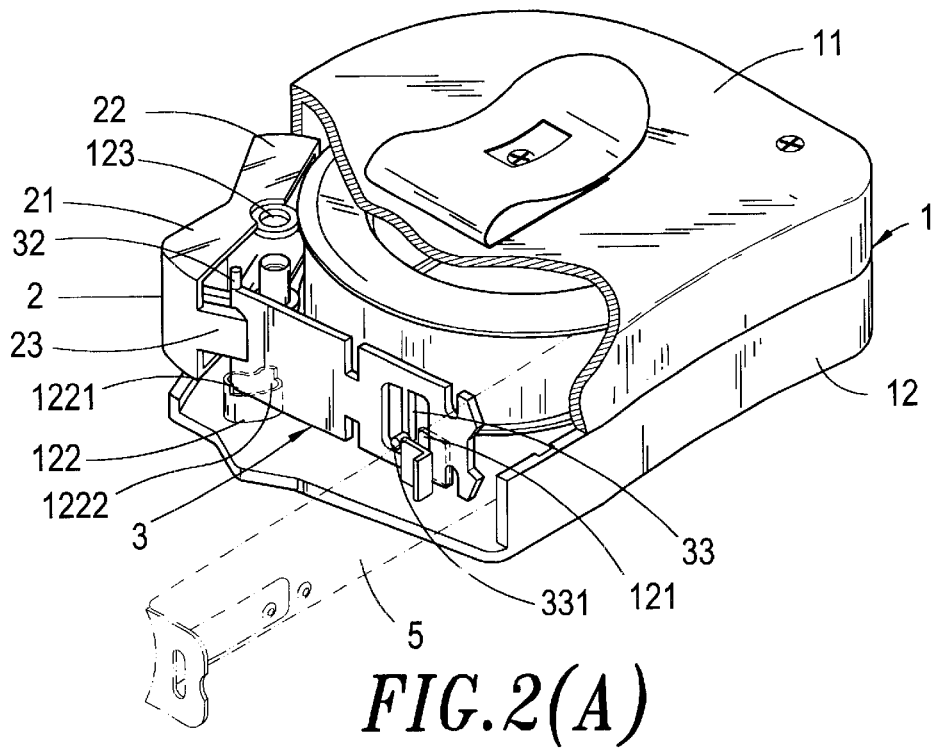
FIGS. 2A and 2B are the drawings illustrating the fundamental principle of the present invention.
Figure 2B:
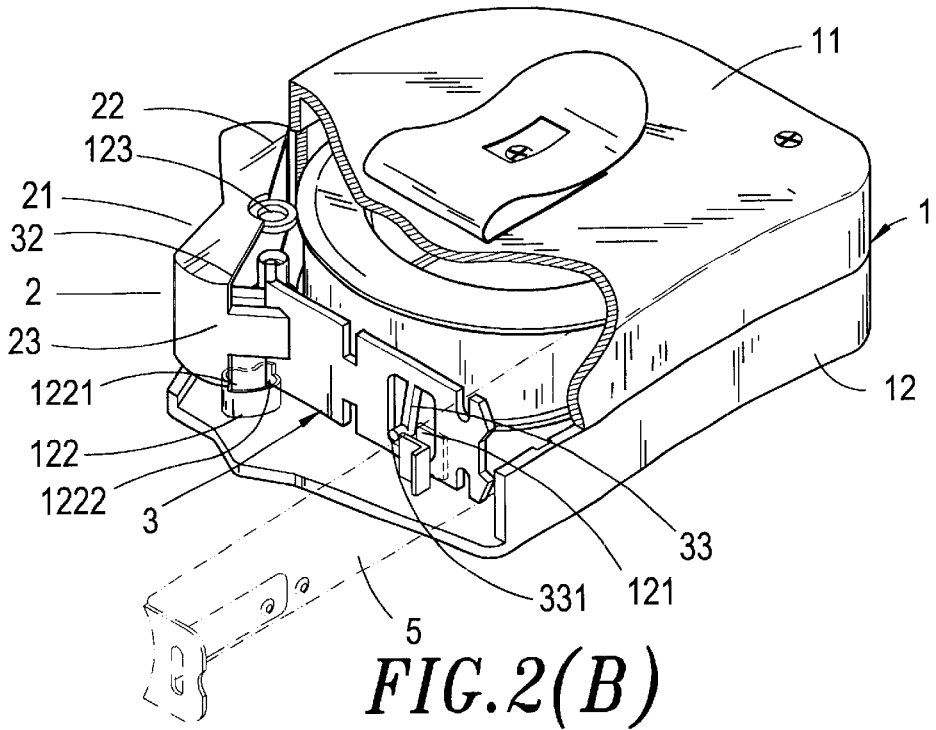
Figure 3A:
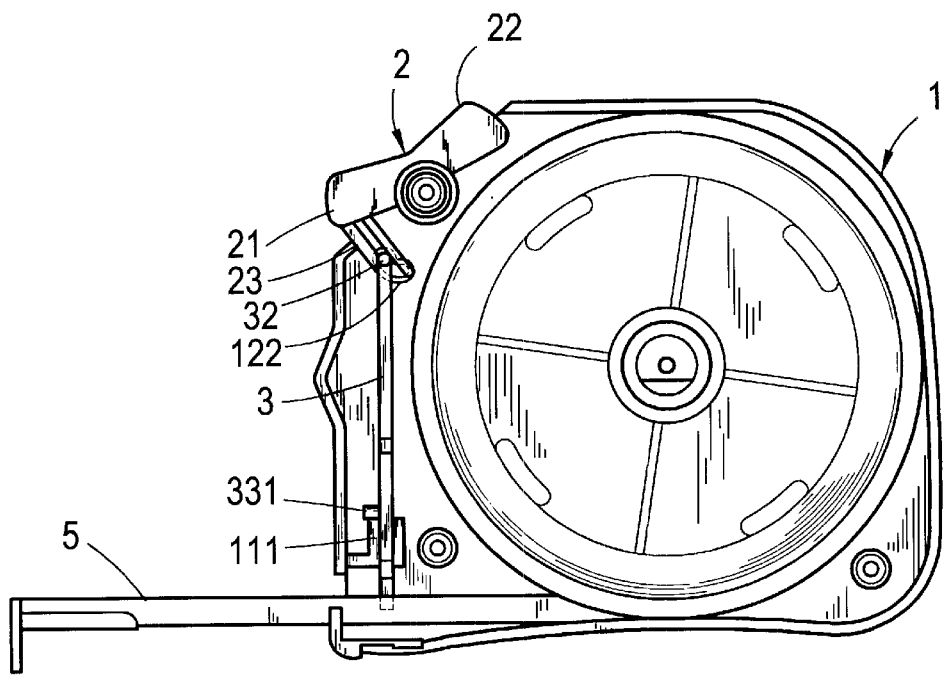
FIGS. 3A and 3B are the drawings illustrating the operational principle of the present invention.
Figure 3B:
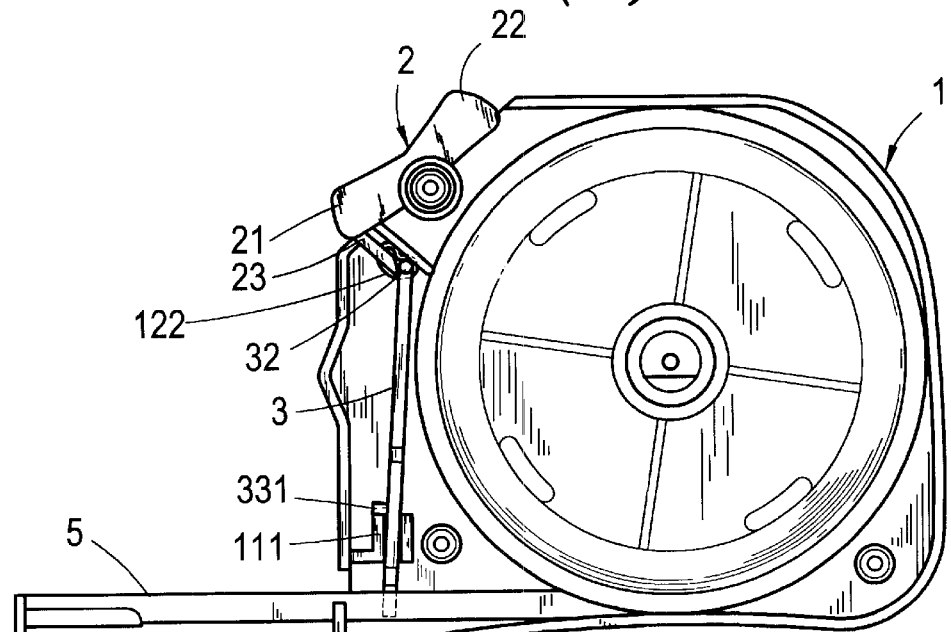

As shown in FIG. 1, the brake device for a tape rule of the present invention comprises a housing 1, a reel 4, a control device 2, and a brake strap 3.

The housing 1 is composed of an upper housing 11 and a lower housing 12, wherein a pair of breaches 114, 124, a pair of guide slots 112, 122, a pair of positioning pins 113, 123, and a pair of slide slots 111, 121 are respectively formed on the upper and the lower housings 11, 12, facing toward each other. Among them the positioning pins 113, 123 are formed in the breaches 114, 124 respectively.

A reel 4 is installed on an axle 124 which is formed on the lower housing 12 for winding a tape 5 thereon, the reel 4 together with the tape 5 is accommodated in the housing 1.

The control device 2 has a brake button 21 and a release button 22 emerged therefrom. The brake button 21 has an extended supporting arm 23 on its end, the supporting arm is provided with a confining slit 231. There are a pair of apertures 24, 25 aligned with each other at the center portion of the control device 2, for respectively inserting the positioning pins 113, 123 installed on the upper and lower housing 11, 12 therein to mount the control device 2 in the housing 1. Thus, the brake button 21 and the release button 22 respectively extend from the breaches 114, 124 formed on the upper and the lower housings 11 and 12. The control device 2 is able to perform a forward and backward movement by respective pressing of the brake and release buttons with respect to the positioning pins 113, 123 as a center axis.

The brake strap 3 has two pivot pins 31, 32 respectively extending from side edges thereof, which are engaged respectively to the left hand side 1121 of the guide slot 112 and the left hand side 1221 of the guide slot 122. A spring tongue 33 is formed on the brake strap 3, at a relevant portion, with a protuberance 331 formed at its end so as to maintain the brake device 3 in the slide slots 111, 121, formed respectively on the upper and the lower housing 11, 12. With this structure, the brake strap 3 is guided in the slide slots 111, 112 such that the protuberance 331 of the spring tongue 33 is mated with the top edge of the slide slot 121 formed in the lower housing 12. As a result, the top end of the brake strap 3 is accommodated in the confining slit 231 of the supporting arm 23, while its lower end is disposed near the surface of the tape 5.

Referring to FIGS. 2A, 2B and 3A, 3B, the drawings illustrate the fundamental principle (FIGS. 2A, 2B) and the operational principle (FIGS. 3A, 3B) of the present invention, respectively. When the tape 5 is pulled and extended to a designated length, the brake button 21 of the control device 2 is pressed so that the supporting arm 23 pushes the brake strap 3 causing the pivot pins 31, 32 to slide from the left hand sides 1121, 1221 of the guide slots 112, 122 to the right hand sides 1122, 1222 of the guide slots 112, 122, and are positioned thereat. At the same time, the brake strap 3 slides downwards so as to detain the tape 5 by urging it against the housing 1. Meanwhile, the spring tongue 33 is flexed as its end protuberance 331 is blocked at the guide slot 121 formed in the lower housing 12 and produces a resilient force. As soon as the releasing button 22 is pressed, the brake strap 3 is restored to its initial state, with the aid of the resiliency of the spring tongue 33, so that the tape 5 is released from the detention and is free to retract.

Figure 4:
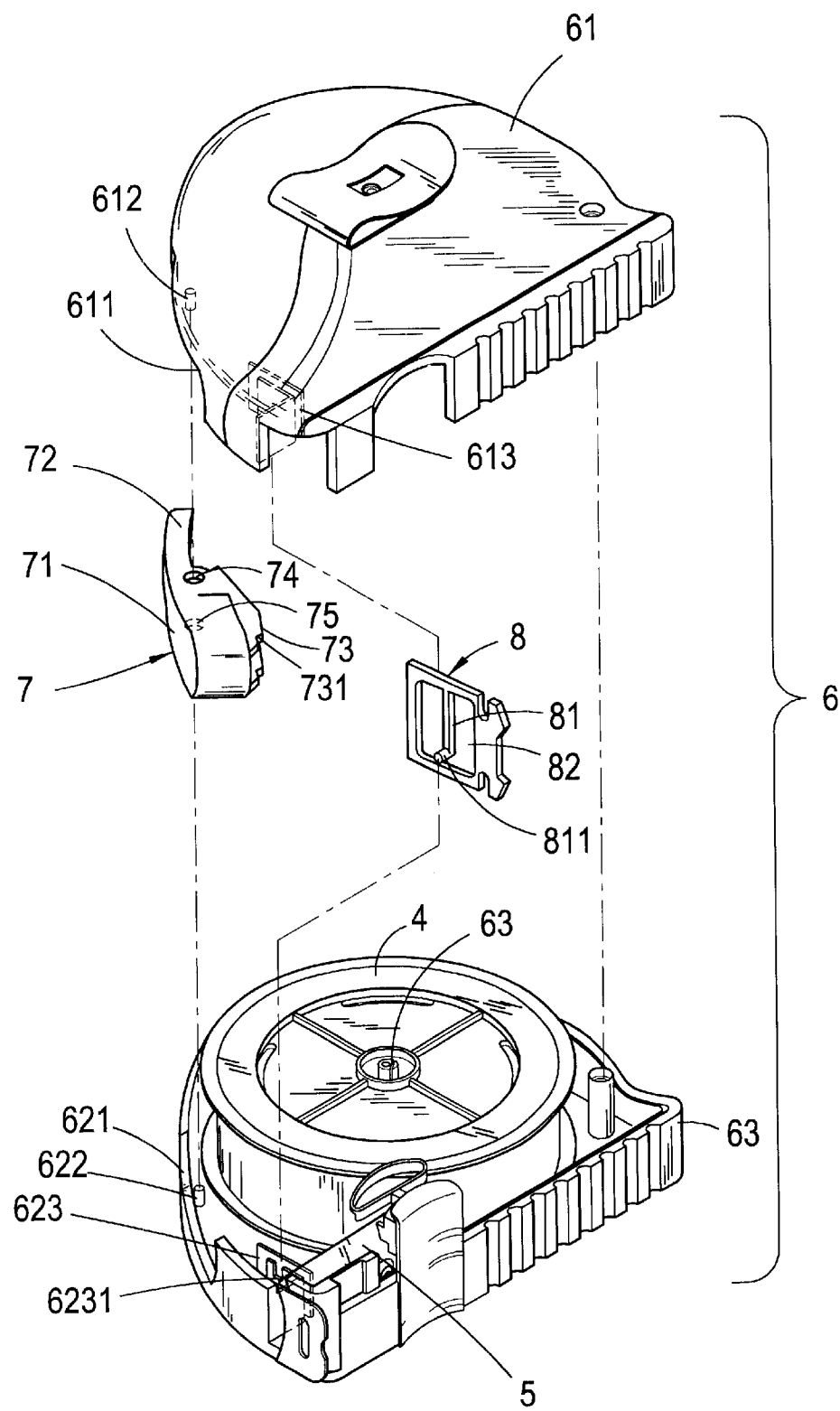
FIG. 4 is an exploded illustrative view of another embodiment of the present invention.
Figure 5A:
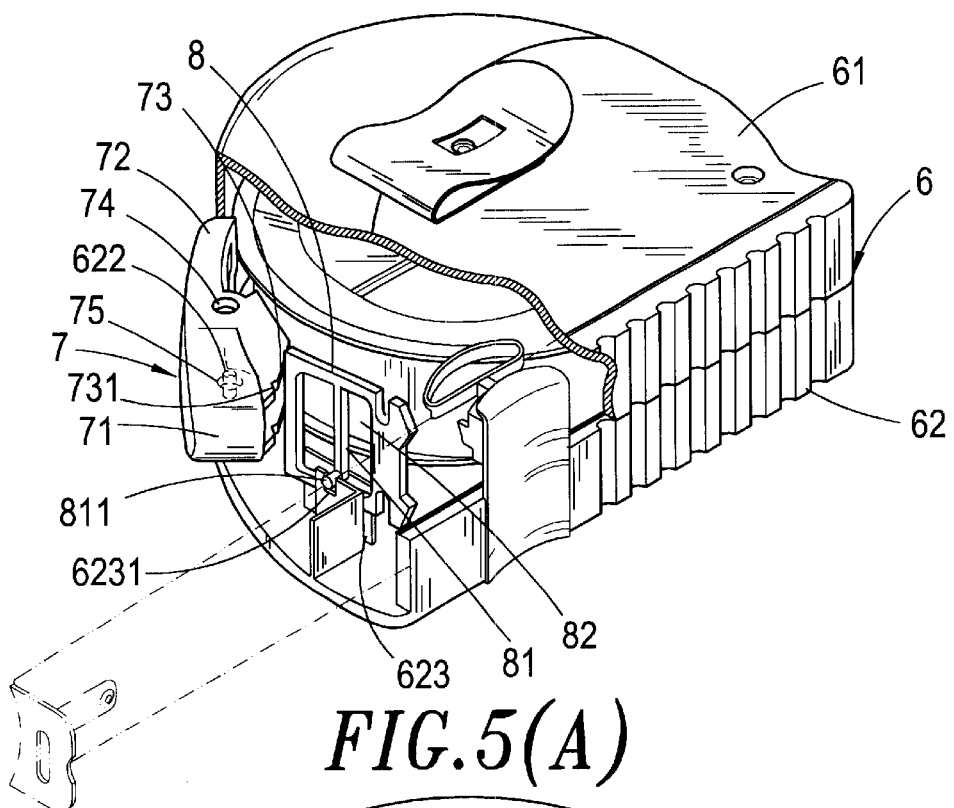
FIGS. 5A and 5B are the drawings illustrating the fundamental principle of the embodiment of the present invention shown in FIG. 4.
Figure 5B:
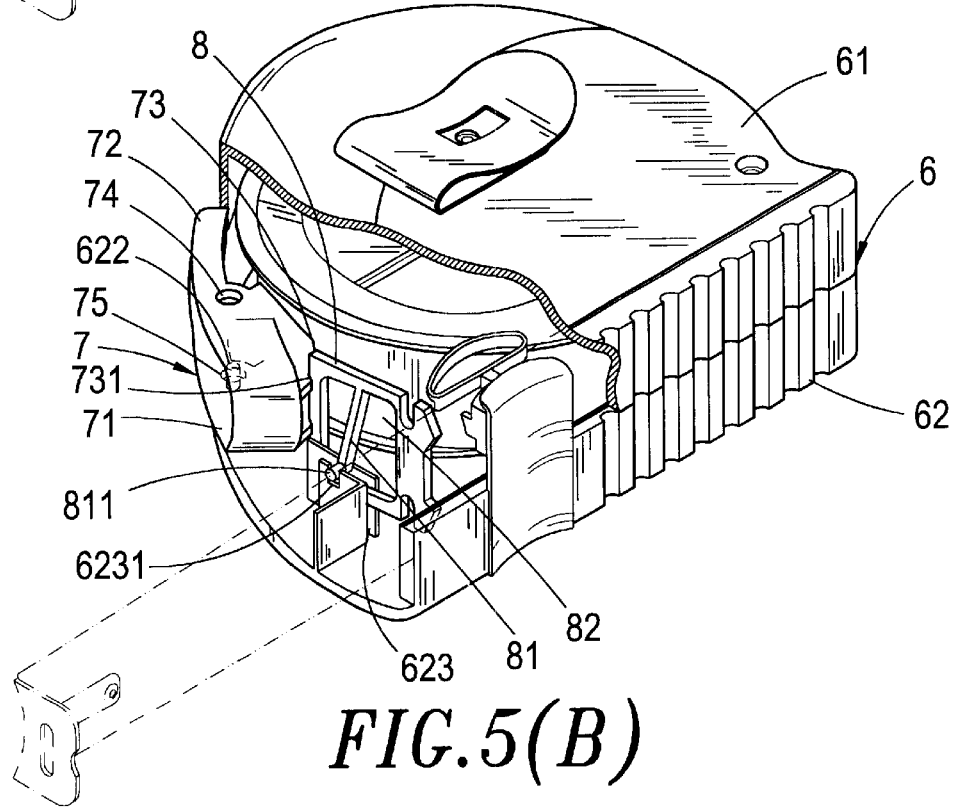

Referring to FIGS. 4, 5A and 5B, the drawings show an exploded view of another embodiment of the present invention (FIG. 4), and illustrate the fundamental principle of that embodiment (FIGS. 5A, 5B).

The brake device for a tape rule in this embodiment comprises a housing 6, a reel 4, a control device 7, and a brake strap 8.

The housing 6 is composed of an upper housing 61 and a lower housing 62, wherein a pair of breaches 611, 621, a pair of slide slots 613, 623, and a pair of positioning pins 612, 622 are respectively formed on the upper and the lower housings 61, 62, facing each other. Among them, the positioning pins 612, 622 are formed in the breaches 611, 621 respectively. The slide slot 623 of the lower housing 62 further has an opening 6231 formed at one edge thereof.

A reel 4 is installed on an axle 63 which is formed on the lower housing 62 for winding a tape 5 thereon.

The control device 7 has a brake portion 71 and a release portion 72 thereon. A slipway 73 is formed at the bottom of the brake portion 71 and has a confining slit 731 at its end terminal thereof. A pair of apertures 74, 75 are provided and aligned coaxially at the center of the control device 7.

The brake strap 8 has an aperture 82 at its center portion thereof, a slender spring tongue 81 is extended from one side of the aperture 82, and a protuberance 811 is formed at the end of the spring tongue 81, orthogonal to the spring tongue 81.

The control device 7 is assembled to the housing 6 by fitting the positioning pins 612, 622 into the apertures 74, 75 and extending its brake portion 71 and releasing potion 72 out of the breaches 611, 621. The brake strap 8 is accommodated in the slide slots 613, 623 formed on the upper and the lower housings 61, 62, with its protuberance 811 fitted in the opening 6231 formed in an edge of the slide slot 623, and the top end of the brake strap 8 is inserted into the slipway 73 at the bottom of the brake portion 71.

When the tape 5 is to be halted, by pressing the brake portion 71 of the control device 7, the brake strap 8 is forced to slide along the slipway 73 at the bottom of the brake portion 71, and then received in the confining slit 731 of the slipway 73, at this moment the brake strap 8 is forced to move downwards and detain the tape 5 thereat. Meanwhile, the protuberance 811 of the brake strap 8 is blocked by its position in the opening 6231 of the lower housing 62, causing the spring tongue 81 to be flexed to produce a resilient force. If the tape 5 is to be wound back onto the reel 4, by pressing the release portion 72 of the control device 7, the top end of the brake strap 8 will be released from the confining slit 731 and it is restored to its initial state with the aid of the resiliency of the spring tongue 81. Thus, the retraction of the tape 5 back into the housing 6 will be achieved.

The present invention has several features which are distinctly superior to the prior art, as follows:

1. Detention of the tape is carried out by pushing the brake strap to slide along the slide slots until it presses the tape to the housing.
2. The force to release the brake comes from the resiliency of a spring, with the result that the durability of the brake device is greatly upgraded over that of the prior art employing a hook.
3. The structure of the present invention is much simpler, more convenient, and much safer than that of the prior art.

Those who are skilled in the art will readily perceive how to modify the invention. Therefore, the appended claims are to be construed to cover all equivalent structures which fall within the true scope and spirit of the invention.

What is claimed is:

1. A brake device for a tape rule comprising:

a housing composed of an upper housing and an lower housing, said upper and lower housings respectively having a pair of breaches defining an opening in said housing, a pair of guide slots, and a pair of slide slots formed therein and disposed in face-to-face relationship;

a reel for winding a tape thereon being accommodated in said housing;

a control device pivotally coupled to said housing and having a brake button portion and a release button portion respectively disposed in said opening formed by said pair of breaches, said brake button portion having an extended supporting arm formed on an end thereof, said supporting arm having a confining slit formed therein; and, a brake strap having a first end disposed in said confining slit and being slidably disposed in said slide slots, two pivot pins respectively extending from opposing side edges thereof and respectively disposed in said pair of guide slots, and a spring tongue disposed at a predetermined portion of said brake strap, said spring tongue having a protuberance formed at a distal end thereof and extending orthogonal said spring tongue and being blocked by an edge of one of said slide slots, wherein a second end of said brake strap is pressed against the tape responsive to depression of the brake button portion of said control device, said depression of said brake button portion displacing said brake strap through said slide slots and displacing said pivot pins from a first position in said guide slots to a second position therein, said spring tongue being resiliently displaced by said displacement of said brake strap to establish a bias force to reversibly displace said brake strap and thereby release the tape responsive to depression of said release button portion of said control device.

* * * * *